US007360063B2

(12) United States Patent
Capek et al.

(10) Patent No.: US 7,360,063 B2
(45) Date of Patent: Apr. 15, 2008

(54) METHOD FOR SIMD-ORIENTED MANAGEMENT OF REGISTER MAPS FOR MAP-BASED INDIRECT REGISTER-FILE ACCESS

(75) Inventors: Peter G. Capek, Ossining, NY (US); Jeffrey H. Derby, Chapel Hill, NC (US); Robert K. Montoye, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 11/366,884

(22) Filed: Mar. 2, 2006

(65) Prior Publication Data

US 2007/0226466 A1 Sep. 27, 2007

(51) Int. Cl.
*G06F 9/35* (2006.01)
(52) U.S. Cl. .......................................... 712/217; 712/22
(58) Field of Classification Search .................... 712/2, 712/22, 217
See application file for complete search history.

(56) References Cited

U.S. PATENT DOCUMENTS

| 4,992,938 | A | * | 2/1991 | Cocke et al. ................ | 712/217 |
| 5,546,554 | A | * | 8/1996 | Yung et al. .................. | 711/203 |
| 2002/0156997 | A1 | * | 10/2002 | Farrell et al. ................ | 712/217 |
| 2003/0191924 | A1 | * | 10/2003 | Weaver ........................ | 712/217 |
| 2004/0015677 | A1 | | 1/2004 | Moreno et al. ................ | 712/22 |

OTHER PUBLICATIONS

Capek et al., "Apparatus for Increasing Addressability of Registers Within a Processor", U.S. Appl. No. 11/065,602, filed Feb. 23, 2005.
Tyler et al., "AltiVec™: Brining Vector Technology to the PowerPC™ Processor Family", IEEE, Motorola Inc., Document No. 0-7803-6258-0/99, pp. 437-444 (1999).
"Intel Itanium™ Architecture Software Developer's Manual", vol. 1, pp. 1:19-1:30, 1:65-1:70, and 1:169-1:190, Oct. 2002.
Tyson et al., "Evaluating the Use of Register Queues in Software Pipelined Loops", IEEE Trans. Computers, vol. 50, No. 8, pp. 769-783, Aug. 2001.
Kiyohara et al., "Register Connection: A New Approach to Adding Registers into Instruction Set Architectures", In Proc., ISCA, pp. 247-256, 1993.

* cited by examiner

*Primary Examiner*—David J. Huisman
(74) *Attorney, Agent, or Firm*—Heslin Rothenberg Farley & Mesiti, P.C.

(57) ABSTRACT

A facility is provided for managing register maps for map-based indirect register file access within a processor. The management facility includes a register mapping including a set of maps, each map of the set of maps having a plurality of map registers. A set of actual registers is indirectly accessed by the processor via map entries of the set of maps. The number of actual registers in the set of actual registers is greater than the number of map entries in the set of maps, and the map entries of the set of maps reference only a subset of the set of actual registers at any given time. The facility includes managing updates to multiple entries of the set of maps of the register mapping by updating multiple map entries of at least one map of the set of maps responsive to executing a single update instruction.

10 Claims, 11 Drawing Sheets

METHOD FOR SIMD-ORIENTED MANAGEMENT OF REGISTER MAPS FOR MAP-BASED INDIRECT REGISTER-FILE ACCESS

CROSS-REFERENCE TO RELATED APPLICATION

This application contains subject matter which is related to the subject matter of the following application, which is assigned to the same assignee as this application and which is hereby incorporated herein by reference in its entirety:

"Apparatus for Increasing Addressability of Registers Within a Processor", Capek et al., Ser. No. 11/065,602, filed Feb. 24, 2005.

TECHNICAL FIELD

The present invention relates in general to management of registers within a processor, and more particularly, the methods, systems and program products for single-instruction-multiple-data (SIMD)-oriented management of register maps for map-based indirect accessing of register files.

BACKGROUND OF THE INVENTION

Registers are employed by a processor or execution unit to store various data intended for manipulation. Registers are preferred for data manipulations over, for example, system memory in many aspects. For example, registers can typically be designated by fewer bits in instructions than locations in system memory require for addressing. In addition, registers have higher bandwidth and shorter access time than most system memories. Furthermore, registers are relatively straightforward to design and test. Thus, modern processor architectures tend to have a relatively large number of registers.

Although performance of a processor/execution unit can generally be improved by increasing the number of registers within the processor, a large number of registers can also present problems. One of these problems is register addressability. If a processor includes a large number of addressable registers, each instruction having one or more register designations would require many bits to be allocated solely for the purpose of addressing registers. For example, if a processor has 32 registers, a total of 20 bits are required to designate four registers within an instruction because five bits are needed to address all 32 registers. Thus, the maximum number of registers that can be directly accessed within a processor architecture is effectively constrained.

Indirection is a technique that has been used to access large register files. An indirection mechanism useful for extending an architecture such as the PowerPC™ processor marketed by International Business Machines Corporation, should accommodate very large register files and satisfy the following objectives:

Compatibility with the standard PowerPC™ instruction format;

Support for existing code without recompilation;

Sufficient flexibility to support loop unrolling, software pipelining, and related software techniques used to mitigate the effects of long pipeline latencies; and Sufficient flexibility to support software techniques for maintaining appropriately large subsets of the working data set in the register file within inner loops.

Prior art indirection mechanisms for accessing large register files fail to meet one or more of the above-mentioned objectives. These prior art indirection mechanisms include:

Itanium™—employs a technique referred to as "rotating registers" to provide indirect access to contiguous sets of registers from the upper 96 registers in register files with 128 registers. Itanium™ is useful for loop unrolling but not for taking advantage of the large register files in more general ways. ("Intel Itanium™ Architecture Software Developer's Manual", October 2002.)

"Register Queues"—are similar in some respects to rotating registers, with apparently increased flexibility in defining and establishing access to the contiguous register sets. Because the indirect access is still constrained to be to sets of contiguous registers, there is insufficient flexibility. (Tyson et al., IEEE Trans. Computers, August 2001.)

"Register Connection"—appears to be more general and thus a more flexible mechanism for indirect access of large register files than rotating registers and register queues. However, it is limited in that, if used with the PawerPC™ architecture, only 32 registers would be accessible by the instructions issued in any particular cycle, due to the mechanism used to map register names coded in an instruction to actual physical registers in the register file. (Kiyohara et al., in Proc., 1993, ISCA.)

Consequently, it would be desirable to provide an improved apparatus for increasing the ability of a processor to address registers.

SUMMARY OF THE INVENTION

In the above-incorporated patent application entitled "Apparatus for Increasing Addressability of Registers within a Processor", a novel indirection mechanism is described that meets the four objectives outlined above. This mechanism employs mappings between a base set of register names and an extended set of register names. In the case of the PowerPC™ architecture, the base set of names is a set of names in the existing architecture, i.e., 0-31, while the extended set of names is determined by the number of registers that may actually be implemented in an extended version of the architecture. The mappings have the following properties:

The mappings are contained in registers.

The mappings are managed by software, i.e., the registers containing the mappings can be written to and read from by instructions that would be part of an extended architecture supporting the indirection mechanism.

The mappings can be arbitrary, based on how the software chooses to manage them.

The mappings have positional association with the register operands appearing in machine instructions.

For a map-based indirection mechanism with these characteristics, there is a set of objectives that should be met with respect to how the mappings are managed, including:

1. The map management mechanism should support a degree of flexibility in how the maps are used, appropriate for meeting the basic objectives for the indirection mechanism listed above.
2. Map management should be efficient, for example, in terms of the fraction of the number of instructions executed in an inner loop that are required to manage the maps.
3. Pipeline latencies associated with map management should not adversely effect its flexibility or efficiency.

Presented herein are methods, system and program products for SIMD-oriented management of register maps which meet these three objectives.

In accordance with one aspect of the present invention, a method of managing registers of a processor is provided. The method includes: providing a register mapping comprising a set of maps, each map of the set of maps comprising a plurality of map registers; providing a set of actual registers indirectly referenced/accessed by the processor via map entries of the set of maps of the register mapping, wherein the number of actual registers in the set of actual registers is greater than the number of actual map entries in the set of maps, and wherein the map entries of the set of maps reference only a subset of the set of actual registers at any given time; and managing updates to map entries of the set of maps of the register mapping by updating multiple map entries of at least one map of the set of maps responsive to executing a single update instruction.

In other aspects, the managing of map entry updates occurs concurrent with the processor employing at least some other map entries of the set of maps to indirectly access the set of actual registers for the processing of data. Further, the managing of map updates can occur concurrent with the processor employing at least some other map entries of the at least one map having the multiple map entries being updated via the single update instruction, wherein the single update instruction is a single-instruction-multiple-data (SIMD) instruction. Multiple approaches to implementing map entry updates are disclosed and claimed. For example, the single update instruction could comprise a "move data from SIMD register to map register" instruction. Alternatively, map entries could be updated employing an "increment map register" instruction using an increment value of an associated increment register, or employing pre-incremented map registers associated with the plurality of map registers. Still further, map entries could be updated employing a "set map register immediate" instruction wherein an initialization value for beginning incremental initialization of the multiple map entries is provided in the instruction itself.

In another aspect, a system for managing registers of a processor is provided. The system includes a register mapping comprising a set of maps, wherein each map of the set of maps comprises a plurality of map registers, and a set of actual registers is indirectly accessed by the processor via map entries of the set of maps of the register mapping. The number of actual registers in the set of actual registers is greater than the number of map entries in the set of maps, and the map entries of the set of maps reference only a subset of registers of the set of actual registers at any given time. The system further includes means for managing updates to multiple map entries of the set of maps of the register mapping by updating multiple map entries of the at least one map of the set of maps responsive to executing a single update instruction.

In a further aspect, at least one program storage device is provided readable by a computer, tangibly embodying at least one program of instructions executable by the computer to perform a method of managing registers of a processor, wherein the registers include a set of actual registers. The method includes: providing a set of maps, each map of the set of maps comprising a plurality of map registers; allowing the processor to indirectly access the plurality of actual registers via map entries of the set of maps, wherein the number of actual registers in the set of actual registers is greater than the number of map entries in the set of maps, and wherein the map entries of the set of maps reference only a subset of the set of actual registers at any given time; and managing updates to map entries of the set of maps by updating multiple map entries of at least one map of the set of maps responsive to executing a single update instruction.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

The present invention may be implemented in reduced instruction set computing (RISC) processors or complex instruction set computing (CISC) processors. For the purpose of illustration, one embodiment of the present invention, as described below, is implemented on a RISC processor, such as the PowerPC™ family processor manufactured by the International Business Machines Corporation of Armonk, N.Y.

Figure 1:
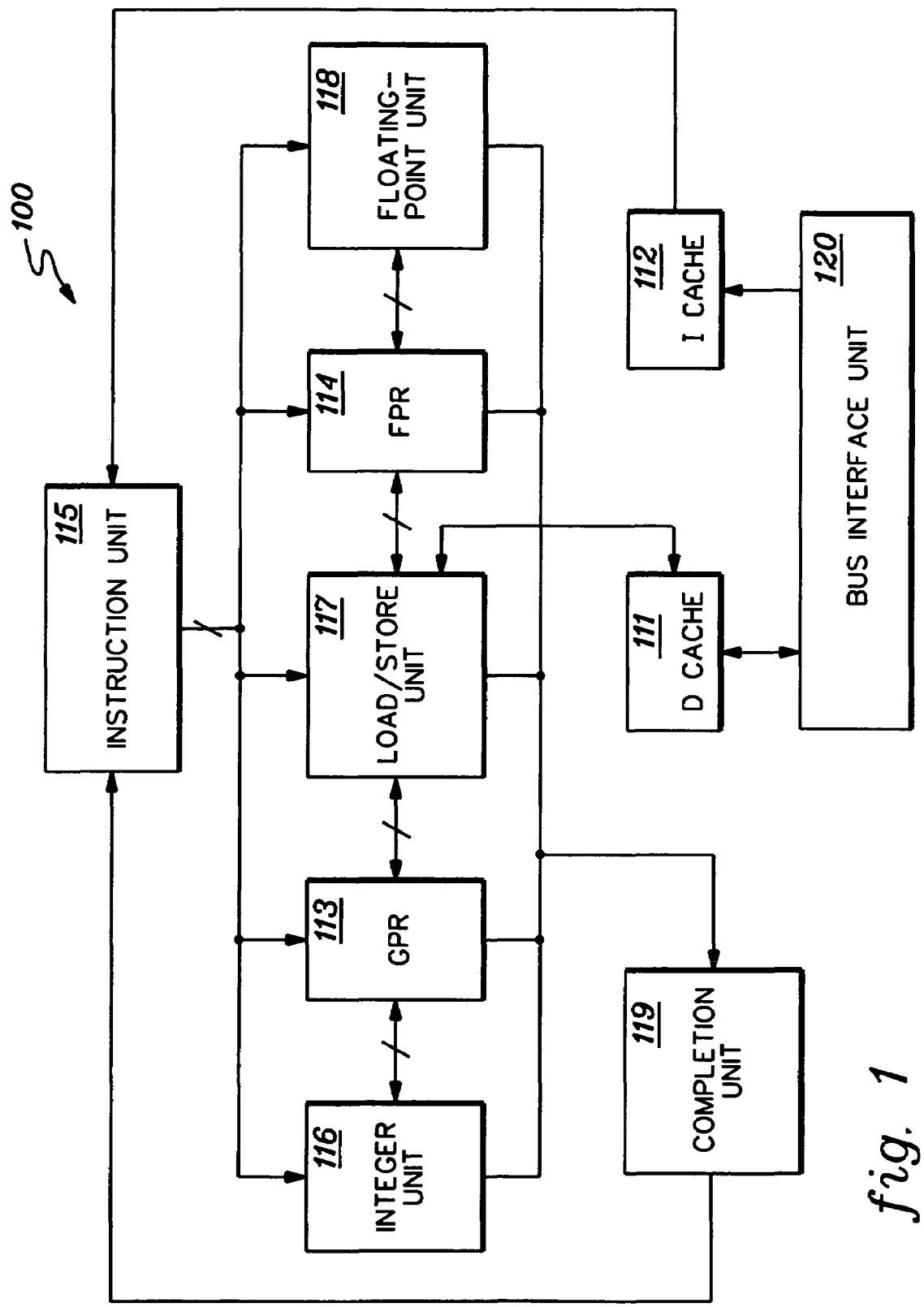
FIG. 1 depicts a block diagram of a processor employing map-based indirect register file access, in accordance with an aspect of the present invention.

FIG. 1 depicts a block diagram of a processor 100 to implement indirect register-file access, in accordance with an aspect of the present invention. Processor 100 includes a data cache 111 and an instruction cache 112, both of which are connected to a bus interface unit 120. Instructions are retrieved from a memory (not shown) to processor 100 through bus interface unit 120 and are stored in instruction cache 112. Data retrieved through bus interface unit 120 is stored in data cache 111. Instructions are fetched as needed from instruction cache 112 by an instruction unit 115 that includes an instruction fetcher, a branch prediction module, an instruction queue and a dispatch unit.

Instruction unit 115 dispatches instructions as appropriate to execution units such as an integer unit 116, a load/store unit 117 and/or a floating-point unit 118. Integer unit 116 performs add, subtract, multiply, divide, shift or rotate operations on integers, retrieving operands from and storing results to general purpose registers 113. Floating-point unit 118 performs single-precision and/or double-precision multiply/add operations, retrieving operands from and storing results to floating-point registers 114. Load/store unit 117 loads instruction operands from data cache 111 into general purpose registers 113 or floating-point registers 114, as needed, and stores instruction results when available from general purpose registers 113 or floating-point registers 114 into data cache 111.

A completion unit 119, which includes multiple reorder buffers, operates in conjunction with instruction unit 115 to support out of order instruction processing. Completion unit 119 also operates in connection with rename buffers within general-purpose registers 113 and floating-point registers 114 to avoid any conflict in a specific register for instruction results.

In accordance one aspect of the present invention, a set of apparent registers is used to increase the addressability of a set of actual registers within a processor. The apparent registers are addressed in a space called the apparent register name space, and the actual registers are addressed in a larger space called the actual register name space. Entries in the apparent registers refer to names of registers in the actual register name space. The apparent register name space is directly addressable by a register number used in an instruction. On the other hand, the actual register name space can be addressed either directly (from some instructions) or indirectly through values stored in the apparent registers.

Figure 2:
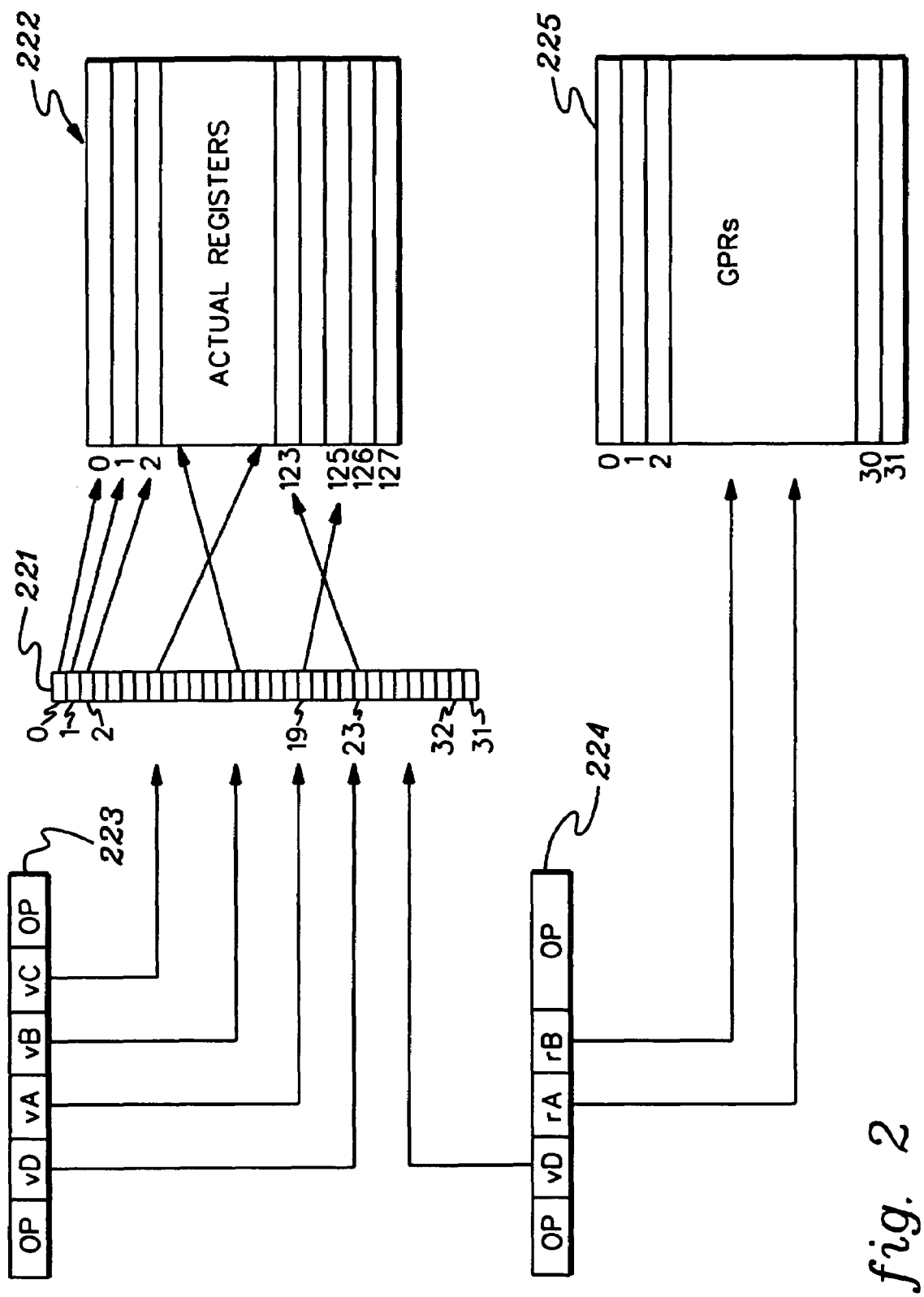
FIG. 2 depicts one embodiment of a mechanism for map-based indirect register-file access for increasing addressability of registers within the processor of FIG. 1, in accordance with an aspect of the present invention.

FIG. 2, depicts a set of apparent registers and a set of actual registers, in accordance with an aspect of the present invention. As shown, apparent registers 221 include multiple register entries. The total number of register entries within apparent registers 221 may equal two to the power of the number of bits in an apparent register field within an instruction 223 reserved for addressing registers. For example, if the number of bits in a register field within instruction 223 is three, then the number of register entries within apparent registers 221 is eight; if the number of bits in an apparent register field within instruction 223 is four, then the number of register entries within apparent registers 221 is sixteen. In the embodiment of FIG. 2, the number of bits in apparent register fields, such as vA field, vB field, vC field and vD field, within instruction 223 is five, and the number of register entries within apparent registers 221 is thirty-two. In the context of a PowerPC™ processor, vA, vB, vC and vD fields are the names of vector (or VMX or Altivec) registers, and one embodiment of the present invention refers to the PowerPC™ vector registers.

Actual registers 222 also include multiple register entries. The number of bits in each apparent register entry is large enough to address the number of provided actual registers, possibly allowing space for future growth in that number. The total number of registers within actual registers 222 may be equal to at least two to the power of the number of bits within a register entry of apparent registers 221. For example, if the number of bits within each register entry of apparent register 221 is five, then the total number of registers within actual registers 222 is thirty-two; if the number of bits within each register entry of apparent registers 221 is six, then the total number of registers within actual registers 222 is sixty-four. In the embodiment of FIG. 2, the number of bits within each register entry of apparent registers 221 is seven, and the total number of registers within actual registers 222 is 128.

During operation, a register within actual registers 222 is selected by the bits within a register entry of apparent registers 221, which is selected by the bits within an apparent register field of an instruction, such as instruction 223. For example, as shown in FIG. 2, register 123 within actual registers 222 is selected by the bits within register entry 23 of apparent registers 221, which is selected by the bits within apparent register field vD of instruction 223. Similarly, register 125 within actual registers 222 is selected by the bits within register entry 19 of apparent registers 221, which is selected by the bits within apparent register field vA of instruction 223.

An instruction may include two different types of register fields. As shown in FIG. 2, an instruction 224 includes an apparent register vD field for indexing into apparent registers 221, as mentioned above. Instruction 224 also includes standard register fields, such as an rA field and an rB field, for directly indexing into a set of general-purpose registers 225. The total number of registers in general-purpose registers 225 are much less than the total number of registers in actual registers 222. Since the number of bits in each of rA field and rB field is five, the maximum number of registers in the set of general-purpose registers is limited to thirty-two.

The control of apparent registers 221 can be designed in a way that is appropriate for the processor architecture in which the present invention is incorporated. In the PowerPC™ architecture, for example, it may be appropriate to control the mapping through two or more registers, described further below in connection with FIGS. 3-14.

The register re-mapping of the present invention can be applied to different sets of registers independently. For example, in the context of the PowerPC™ architecture, the register re-mapping may be applied to vector registers and to floating-point registers but not to general-purpose registers. Thus, the present invention provides a flexible apparatus for increasing addressability of registers within a processor, and can be implemented in a compatible way into existing processor architecture.

Building upon the above-described teachings, also presented herein are methods, systems and program products for single-instruction-multiple-data (SIMD)-oriented management of map entries for map-based indirect referencing of actual register files. Many processor architectures today incorporate single-instruction-multiple-data (SIMD) extensions; for example, PowerPC™ has VMX, Intel IA-32 incorporates SSE3, etc. Disclosed herein, therefore, is a map management facility which takes advantage of certain processors' SIMD features to provide map entry updates in a flexible and efficient manner.

Figure 3:
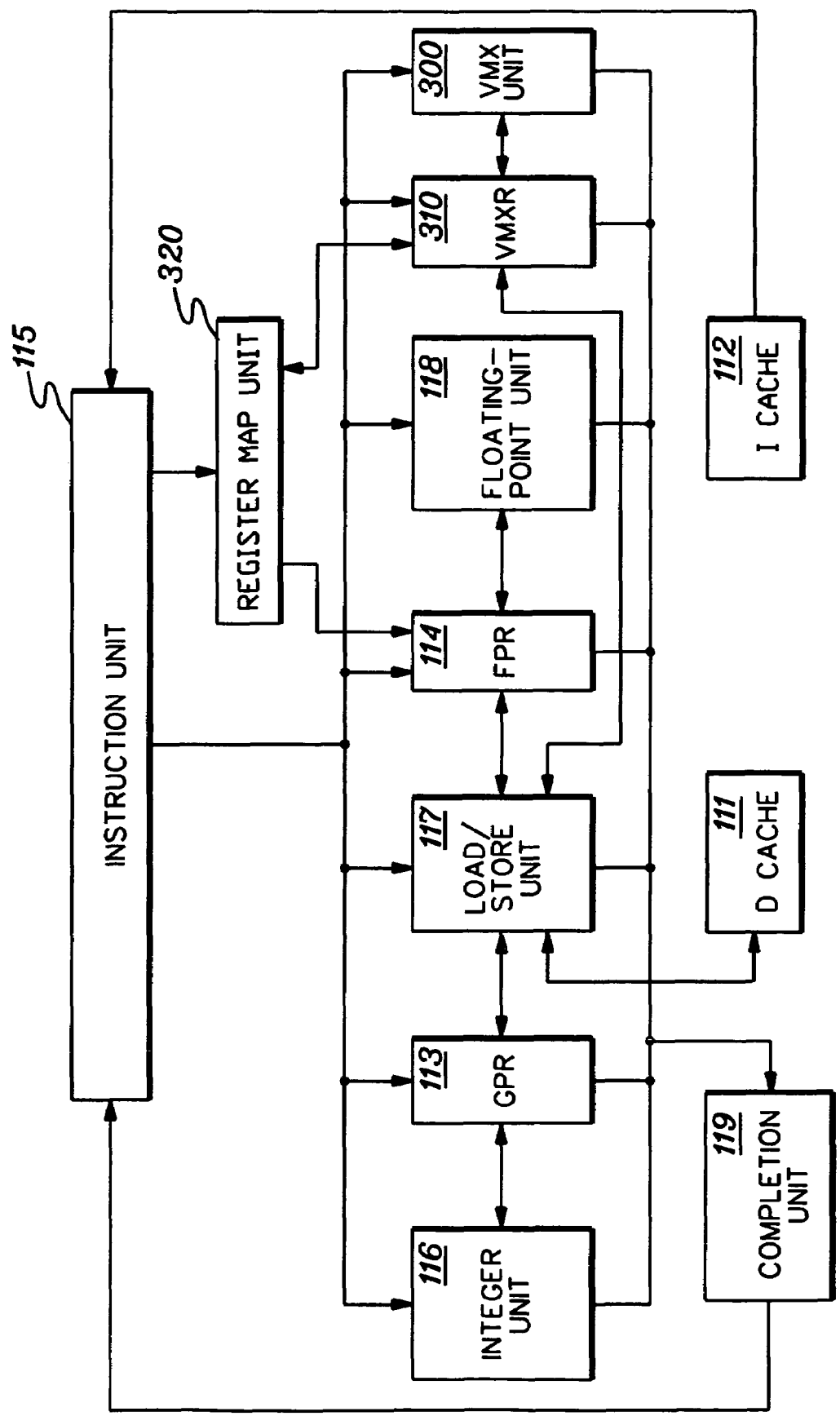
FIG. 3 is a block diagram of another embodiment of a processor employing a map management facility for map-based indirect register-file access, in accordance with an aspect of the present invention.

FIG. 3 depicts one embodiment of a processor employing SIMD-oriented management of register maps for map-based indirect register-file access, in accordance with an aspect of the present invention. The processor again includes a data cache 111, an instruction cache 112, general purpose registers 113, floating-point registers 114, instruction unit 115, integer unit 116, load/store unit 117, floating-point unit 118, and completion unit 119, which respectively function as described above in connection with the processor of FIG. 1. The processor of FIG. 3 further includes a VMX unit 300 and associated VMX registers (VMXR) 310. As is well known, the VMX unit and associated registers provide computational capability that employs SIMD processing and performs, for example, a common operation in parallel on multiple data elements. In one implementation, data elements may be half-words, and the VMX registers may each comprise 128 bits interpreted as eight 16-bit half-words (see FIGS. 6A & 6B). Thus, execution of a single SIMD instruction within the VMX results in eight operations being performed at a time, as one example.

Also provided within the processor of FIG. 3 is a register map unit 320, which is shown coupled to both the VMX registers 310 and to the floating-point registers 114. This example assumes that the large register file containing the set of actual registers to be indirectly referenced is the floating-point register file 114 used by the floating-point unit. Note that the right-hand arrow between register map unit 320 and VMXR 310 represents a capability to move the contents of a VMX register to a map register and vice versa, as described below.

By way of example, a typical floating-point register may comprise 32 registers, while a large register file, as envisioned by an aspect of the present invention, may comprise 1024 registers. Positioning of the large register file within the floating-point register is only one example. Alternatively, or additionally, a large register file to be indirectly accessed could be the VMX register file 310. As one consideration, however, the large register file is preferably associated with an execution unit within the processor where pipeline latencies are a concern, wherein use of the large register file mitigates effects of pipeline latency, e.g., through techniques such as loop unrolling and software pipelining.

Figure 4:
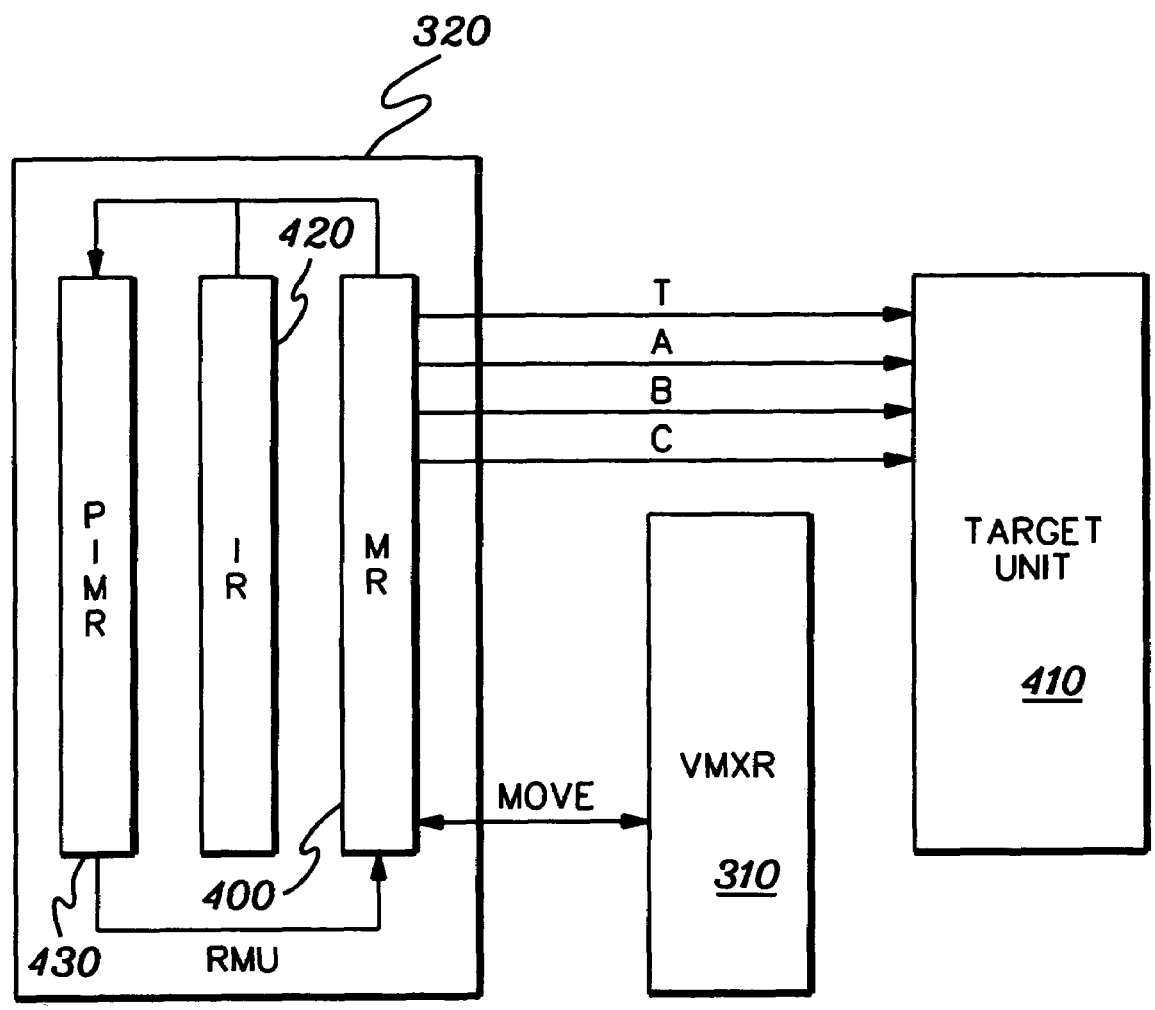
FIG. 4 is a block diagram representation of one embodiment of a register map unit, and illustrating aspects of management of map entries, and indirect access of an actual set of registers in a target unit, in accordance with aspects of the present invention.

FIG. 4 depicts in greater detail one embodiment of a register map unit 320, in accordance with an aspect of the present invention. The register map unit includes a set of maps, and each map of the set of maps comprises a plurality of map registers, all of which are generally denoted as map register (MR) 400. In one example, the map registers contain map entries structured with the same format as the registers of the SIMD execution unit, i.e., the VMX registers 310 in the example of FIGS. 3 & 4. For example, referring to FIG. 6A, assume that the VMX registers are 128-bits wide, each holding sixteen one-byte data elements, eight half-word data elements, or four full-word data elements. The registers containing the map entries are also chosen to be 128-bits wide. Assume further that based on the size of the extended register set, the number of bits needed to encode a map entry is greater than eight and less than seventeen. Then, each 128-bit map register contains eight map entries, each occupying one half-word of the register, as shown in FIG. 6B. In this discussion, the registers containing these map entries are referred to as the map registers 400.

Figure 6A:
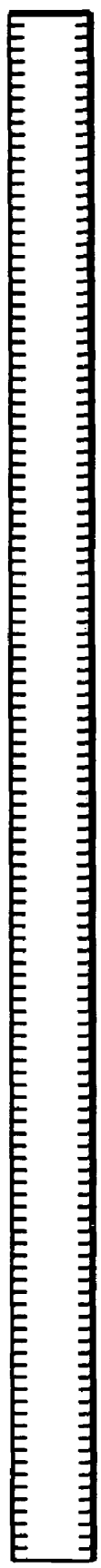
FIG. 6A depicts a conventional 128-bit VMX register associated with a VMX unit of, for example, a PowerPC™ processor.
Figure 6B:
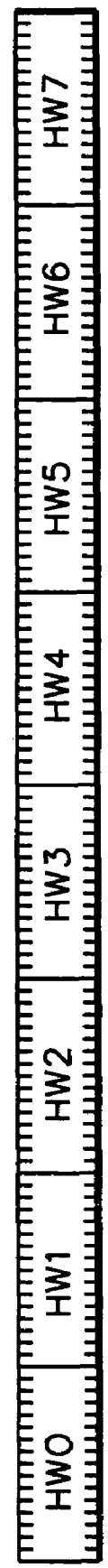
FIG. 6B depicts one embodiment of a map register comprising 128 bits divided into eight 16-bit half-words, and illustrating the common sizing of the map register and the VMX register, in accordance with an aspect of the present invention.

Thus, one point to note is that the physical structure of a map register is identical to that of a SIMD register (e.g., a VMX register), i.e., each map register is 128-bits wide as shown in FIG. 6A. A second and related point is that the logical structure of a map register is identical to that of an SIMD register (e.g., VMX register), with the contents interpreted as 16-bit half-words (with the logical structure of each map register being shown in FIG. 6B). Each half-word in the map register is a map entry. There are eight map entries held in each map register. Since each map has 32 entries, there are four map registers per map. Since there are four maps, all together there are 16 map registers. A significant benefit of maintaining the correspondence in both physical and logical structure between map registers and SIMD registers is that the existing capabilities of the SIMD execution unit to do arithmetic and logical operations on the contents of the SIMD registers, and also to move the contents of the SIMD registers to and from memory, can be used to efficiently construct maps with essentially arbitrary entries. Sets of eight map entries can be constructed in SIMD registers, with the contents of the SIMD registers then being moved to map registers without the need for any data transformations as part of the move operation. Thus, the register map unit (RMU) can be relatively simple from a hardware perspective. Simple sets of map entries (e.g., setting eight sequential values in a map register, or incrementing all eight entries in a map register by the same constant) can be performed with basic hardware in the RMU. More complicated sets of map entries can be set up in an SIMD register using the SIMD execution unit and then moved into a map register.

There are two other sets of registers in the register map unit (RMU) shown in FIG. 4. These sets of registers comprise increment registers (IR) 420 and pre-incremented map registers (PIMR) 430, both of which can be used for managing map entries as described below.

The target unit 410 in FIG. 4 is the unit whose register file is provided with indirect access via the map-based indirection; i.e., the floating-point register 114 in the example of FIG. 3. The arrows labeled 'T', 'A', 'B' and 'C' indicate the indexed map entries for the register operands being made available to the target unit 410 from the map registers 400. The 'Move' arrow between RMU 320 and VMXR 310 indicates the ability to move the contents of a VMX register to a map register and vice versa, as described further below.

Figure 5:
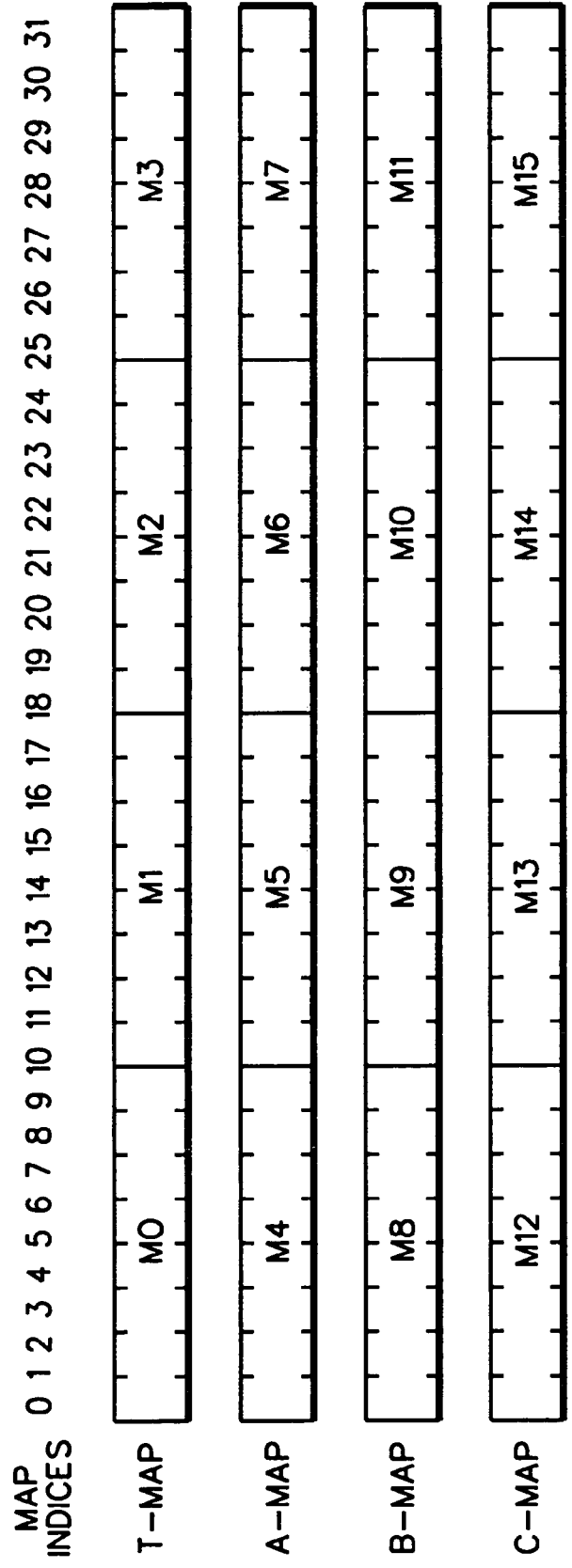
FIG. 5 is a representation of a set of maps employed by a register map unit, in accordance with an aspect of the present invention.

As noted, in one embodiment there are four sets of maps in the register map unit, each with 32 entries. These mappings are illustrated in FIG. 5, and are associated with register operands that appear in the instruction format for instructions that are executed in the target unit, as follows:

T-map: the T-map is associated with the target operand.

A-map: the A-map is associated with the input register operand designated as the 'A' operand in the instruction format.

B-map: the B-map is associated with the input register operand designated as the 'B' operand in the instruction format.

C-map: the C-map is associated with the input register operand designated as the 'C' operand in the instruction format.

In addition, one of these maps, for example the C-map, may be associated with the register operand in load and store instructions that indicates the source or target register in the target unit's register file.

Again, in the example of FIG. 5, there are four sets of maps, each with 32 map entries. At eight half-words (HW), and thus eight map entries, per map register, there are 16 map registers, labeled m0-m15. Each of the sixteen map registers is a 128-bit register (as shown in FIGS. 6A & 6B). Further, each of the eight slots in a map register is a half-word and contains one map entry.

Figure 7:
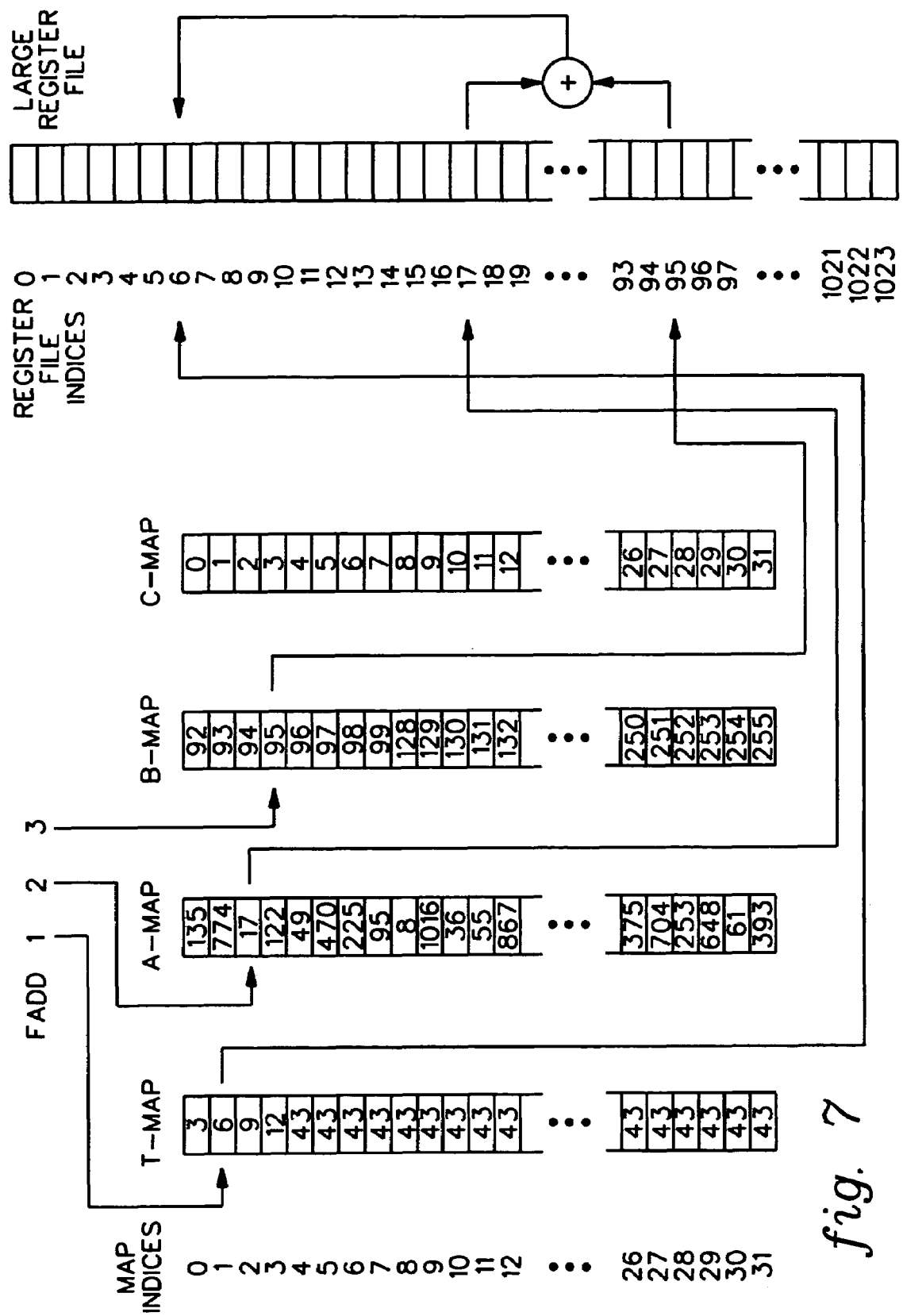
FIG. 7 illustrates another example of map-based indirect register-file access, in accordance with an aspect of the present invention.

Association of a map with a register operand means that the value coded for the operand, which is in the range of 0 to 31, can be used as an index into the map; that is, the value contained in the map entry thus referenced is the index of the register in the large register file to be accessed. Consider, for example, that the target unit is the floating-point unit with the floating-point register file being the large register file accessed using indirection, as shown in FIG. 3, and consider the instruction 'fadd fT, fA, fB', which is illustrated in FIG. 7. In existing PowerPC™ architecture, this executes a floating-point add of the data element in floating-point register fA with the data element in floating-point register fB and places the result in floating-point register fT. If the instruction is encoded as 'fadd 1, 2, 3', that is, with "1" encoded for the fT operand, "2" encoded for the fA operand, and "3" encoded for the fB operand, then according to the existing architecture, the input values are taken from registers 2 and 3 of the floating-point register file and the result is written to register 1 in the floating-point register file. With indirection, the encoded values "1", "2" and "3" are used as indices into the T-map, the A-map, and the B-map, respectively. For example, assume that entry "2" in the A-map contains the value "17", entry "3" in the B-map contains the value "95", and entry "1" in the T-map contains the value "1", then the instruction encoded as 'fadd 1, 2, 3' takes the input operands from registers 17 and 95 and places the results in register 6 of the large register file. This process is shown pictorially in FIG. 7.

The following can be noted with respect to FIG. 7:
In the example, the large register file (for example, disposed within the floating-point register or the VMX register) has 1024 registers. Thus, the extended set of register names contains at least zero through 1023, and a minimum of 10 bits are needed to encode each map entry.
Because the instruction in the example has only three register operands, the C-map is not used.
The map entries are examples of the arbitrariness with which the maps can be configured. In the T-map, most of the entries point to the same physical registers (probably not a realistic situation). In the A-map, the entries have no pattern. The B-map has groups of eight consecutive actual registers indices (names). The C-map is the identity map.

In view of the above, certain features of a map management facility, in accordance with an aspect of the present invention, include:
1. The registers containing map entries are preferably structured to have the same format as the registers in the SIMD execution unit (e.g., the VMX registers). For example, assume the SIMD unit's registers are 128-bits wide, each holding sixteen 1-byte data elements, eight half-word data elements, or four full-word data elements. The registers containing the map entries are also 128-bits wide. Assume that, based on the size of the extended register set, the number of bits needed to encode a map entry is greater than eight and less than seventeen. Then, each 128-bit "map register" contains eight map entries, each occupying one half-word in the register.
2. Operations that set, modify, or read map entries do so in a SIMD-like fashion, in that a single instruction references contents of a single map register, for example, all eight map entries in the register for the example of 128-bit registers, with each map entry occupying a half-word.
3. Simple hardware can be employed to perform simple operations on the contents of the map register, including: (a) setting the map entries to sequential values (e.g., setting the eight map entries in a map register to eight sequential values starting at some specified initialization value); and (b) incrementing all the map entries in the register by the same constant value. The hardware is arranged so that these operations are performed with minimum latency.
4. Given that the format of the map registers matches that of the SIMD registers (e.g., VMX registers), it is possible to move data into a map register directly from an SIMD-unit register, and vice versa. In this way, arbitrary sets of map entries can be constructed using the arithmetic and logical functions already available in the SIMD execution unit (e.g., the VMX unit) and then moved to map registers in the register map unit. Alternatively, sets of map entries can be loaded from memory into the SIMD-unit registers (i.e., the VMX registers) and then moved to map registers. Consequently, the hardware provided specifically for map management can be relatively simple.
5. Support for existing code without recompilation can be provided through the use of an "identity map", in which each entry in a map contains its index in the map (e.g., entry k in the identity map contains the value k). An instruction can be provided that sets each map to the identity map, for efficient and existing-code-compatible initialization of the maps as part of an application binary interface (ABI).

FIGS. 8-14 depict various examples of map management instruction processing, in accordance with aspects of the present invention. The map management instructions use a processor's general instruction format. Such a format generically includes an opcode field, which identifies the function to be performed by the instruction (e.g., floating-point add, load from memory location, etc.), as well as n operands that identify the source data or locations of the source data, and also the target location. In the case of a PowerPC™ architecture, all instructions occupy 32-bits. The opcode has at least six-bits, most often more than six-bits. The number of operand fields and the size of each depends on the instruction.

Figure 8:
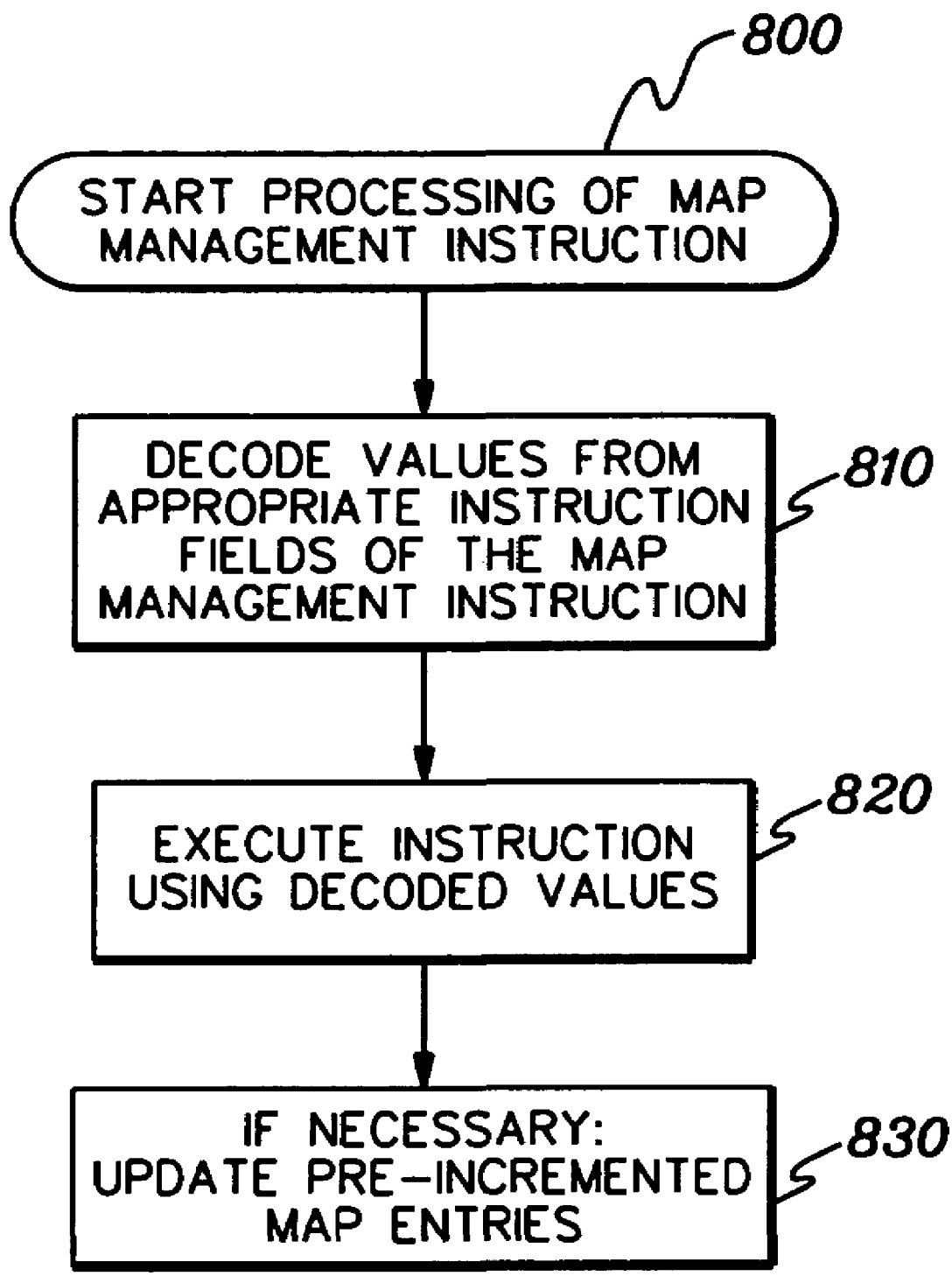
FIG. 8 is an overview flowchart of map management instruction processing, in accordance with an aspect of the present invention.

FIG. 8 depicts processing of a generic map management instruction 800 by decoding values from appropriate instruction fields of the map management instruction 810. Once the operand values have been obtained, then the instruction (i.e., opcode) can be executed using the decoded operand values 820. If necessary, pre-incremented map entries in the set of pre-incremented map registers (PIMR) of FIG. 4 are also automatically incremented. As noted, the instruction fields within the map management instruction define the function of the instruction and provide the map entry references for the indirect register-file access described above. Generally, the processor's instruction unit understands, based on the function, which of the execution units in the processor will perform the desired function and passes the instruction to that execution unit. Thus, in terms of map entry management, the map management instruction is passed to the map register unit for execution.

The pre-incremented memory registers can, in one example, be updated anytime there is a map register change or a change in the associated increment register value. By pre-computing the map entry values, the incremented map entries will be available for a future map management increment instruction. Note that the pre-incremented map registers described herein are one map entry management option only. In one example, there is a one-to-one correspondence between the map registers and the pre-incremented map registers so that the values of the pre-incremented map entries can be simply swapped into the map registers dependent upon the map management instruction received. This processing is described further below with reference to FIGS. 13 & 14.

Figures 9, 10:
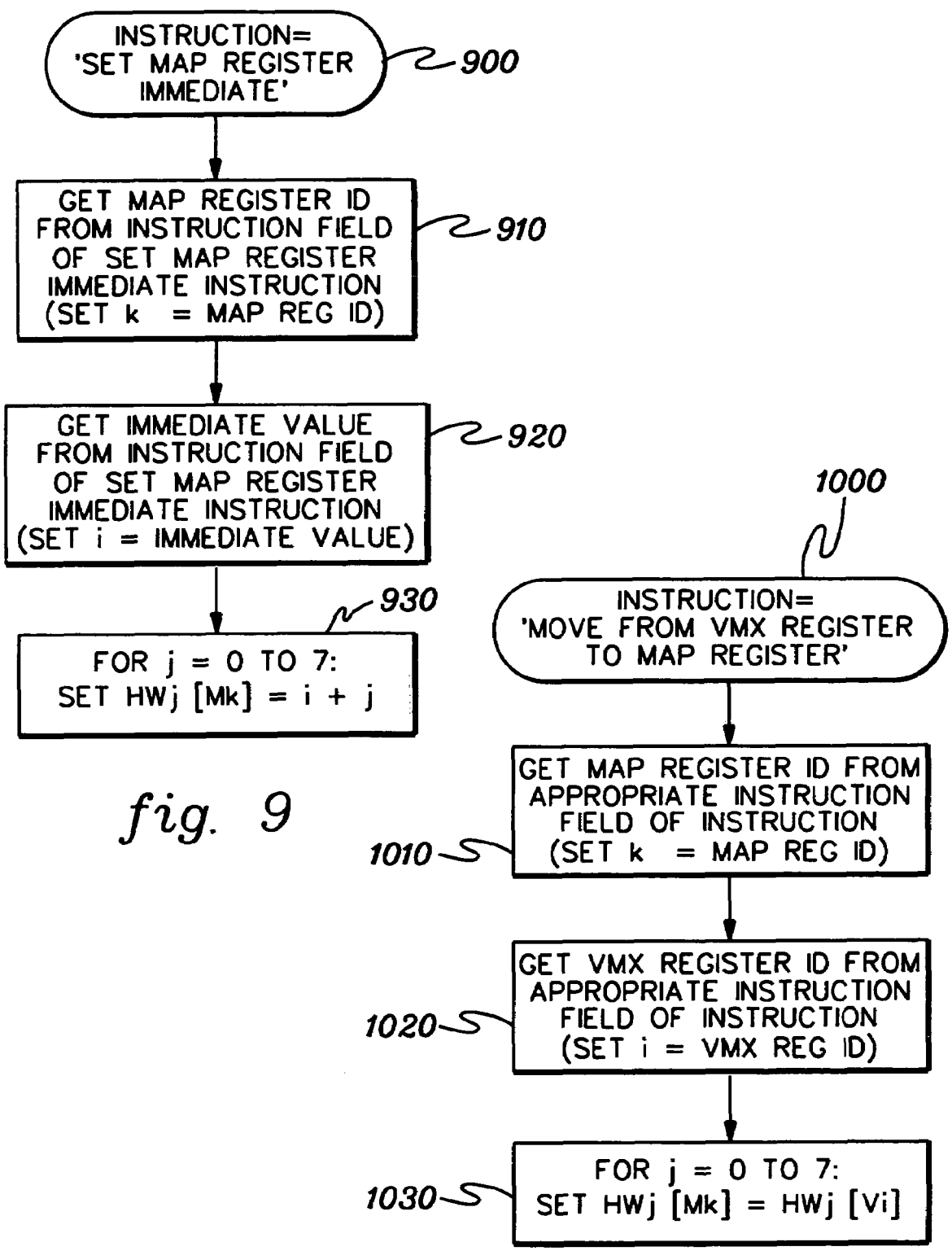
FIG. 9 is a flowchart of one embodiment of "set map register immediate" instruction processing, in accordance with an aspect of the present invention.
FIG. 10 is a flowchart of one embodiment of "move from VMX to map register" instruction processing, in accordance with an aspect of the present invention.

FIG. 9 depicts a processing example for a "set map register immediate" instruction 900. The instruction is initially parsed to obtain the map register ID from the appropriate instruction field of the instruction 910, and the variable k is set to this map register ID. With a "set map register immediate" instruction, the initialize value for the map entry updates is provided within the instruction itself. Thus, processing next gets the immediate initialize value from the appropriate instruction field 920, and sets the variable i to this initialize value. The instruction is assumed to initialize the eight half-words of the identified map register (e.g., see FIG. 6B) to eight consecutive values. Thus, the first half-word (j=0, where j=0 to 7) is set to the immediate initialize value from the instruction, while each subsequent half-word is consecutively increased by a value 1, as represented by the equation $HW_j[Mk]=i+j$. Again, those skilled in the art will recognize that this set map register immediate instruction represents only one approach to updating map entries.

Another approach is depicted in FIG. 10, and is based on the physical and logical format similarity between the map registers and the VMX registers as described above. This instruction is labeled a "move from VMX register to map register" instruction 1000, which is initially processed to get the map register ID from the instruction 1010. The variable k is again set to this map register ID. Next, a VMX register ID from the appropriate instruction field of the instruction is obtained, and this VMX register ID is set to variable i 1020. Then, for each consecutive half-word of the map register, the value of that map entry ($HW_j[Mk]$) is set to the corresponding half-word in the VMX register i ($HW_j[V_i]$) 1030. Alternatively, the processing could simply implement a block copy of the entire contents of the identified VMX register into the identified map register.

Figure 11:
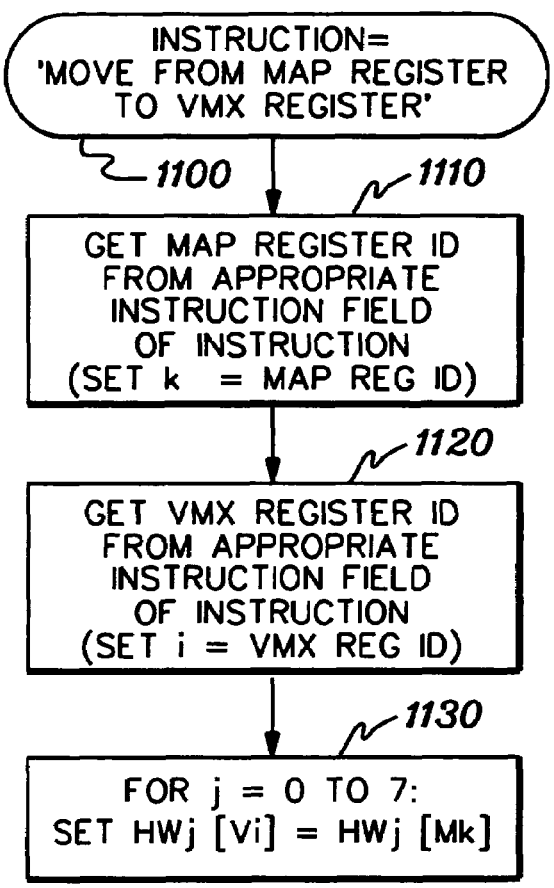
FIG. 11 is a flowchart of one embodiment of "move from map register to VMX register" instruction processing, in accordance with an aspect of the present invention.

FIG. 11 depicts a reverse instruction to that of FIG. 10, wherein map entry contents are moved from the map register to an identified VMX register. Processing of this "move from map register to VMX register" instruction 1100 begins by obtaining the map register ID from the appropriate instruction field of the instruction 1110, and setting this map register ID to the variable k. Next, the VMX register ID is obtained from the appropriate instruction field of the instruction 1120, and this value is set to variable i. Then, for each half-word in the map register ($HW_j[Mk]$), the contents of the corresponding VMX register half-word ($HW_j[V_i]$) are set to the contents of the map entry.

Figure 12:
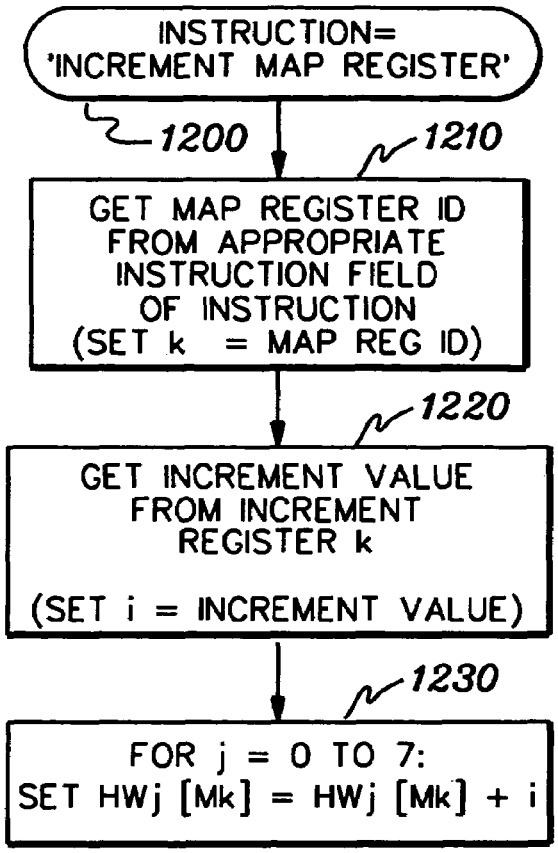
FIG. 12 is a flowchart of one embodiment of "increment map register" instruction processing, in accordance with an aspect of the present invention.
Figure 13:
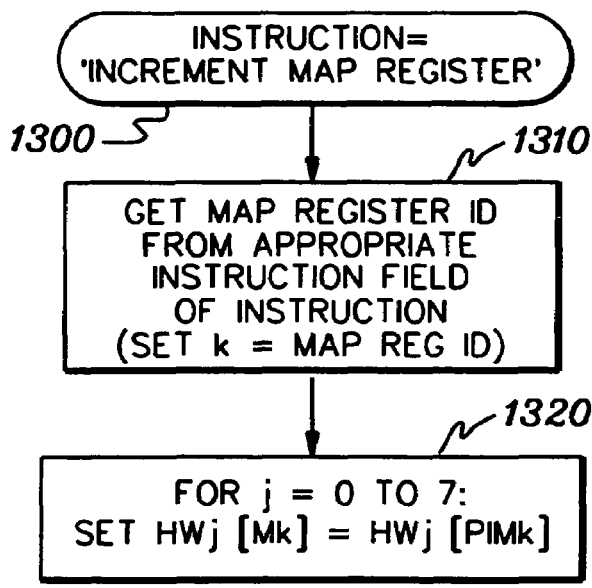
FIG. 13 is a flowchart of another embodiment of "increment map register" instruction processing, in accordance with an aspect of the present invention.

FIGS. 12 & 13 depict alternate embodiments of a simple "increment map register" instruction. Beginning with FIG. 12, the "increment map register" instruction 1200 is initially parsed to obtain the map register ID from the appropriate instruction field of the instruction 1210, which is set to variable k. Further, the increment value from the associated increment register (IR) for map register k is obtained 1220, and this increment value is set to variable i. Processing then increments each successive half-word ($HW_j[Mk]$) of the identified map register by the increment value i 1230.

In the alternate implementation of FIG. 13, the "increment map register" instruction 1300 is again parsed to obtain the map register ID from the appropriate instruction field of the instruction 1310. This map register ID is set to variable k. Then, the corresponding pre-incremented map register k (PIMk) is employed and the respective half-word map entries are simply copied from the pre-incremented map register ($HW_j[PIMk]$) into the corresponding half-words of the identified map register ($HW_j[Mk]$) 1320.

Figure 14:
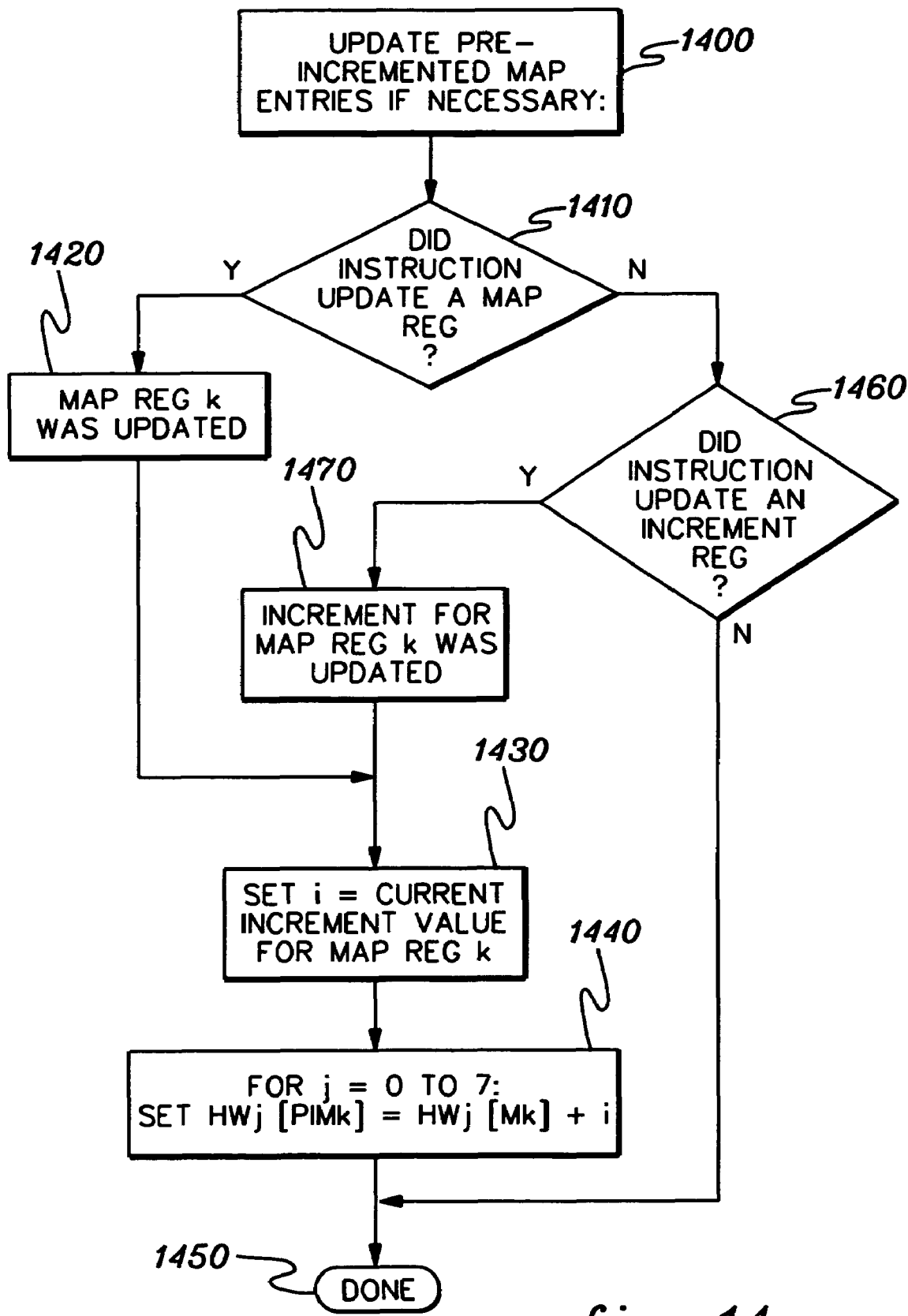
FIG. 14 is a flowchart of one embodiment of a process for automatically updating pre-incremented map entries of a pre-increment map register, in accordance with an aspect of the present invention.

FIG. 14 depicts one embodiment of processing for automatically updating the pre-incremented map entries. This update pre-incremented map entries if necessary processing 1400 begins by inquiring whether an instruction update of a map register occurred 1410. If "yes", map register k is assumed updated 1420, and the variable i is set equal to the current increment value for map register k 1430. If "no", the process inquiries whether an instruction update of an increment register occurred 1460. If "yes", the increment for map register k is assumed updated 1470, and the variable i is set equal to the current increment value for map register k 1430. Again, the current increment value for map register k is held in an increment register (IR) 420 as shown in FIG. 4. Then, for each half-word j=0 to 7, the current entry in map register k ($HW_j[Mk]$) is incremented by the value i ($HW_j[Mk]+i$) and the result is placed in half-word j of pre-incremented map register k 1440. Note here (and above) that $HW_j$ [PIMk] means the $j_{th}$ half-word in pre-incremented map register k. Once the pre-incremented map register is updated, or if the answer to both inquiries was "no", processing is complete 1450.

Assuming that the just executed instruction did not update a register 1410, then processing determines whether the previously executed instruction updated an increment register 1460. If "no", processing is complete 1450. Otherwise, processing identifies that the updated increment register was for map register k 1470, and proceeds to update the corresponding pre-incremented map entries as described above.

Those skilled in the art will recognize from the above discussion that provided herein is a flexible facility for managing map entries of map registers for map-based indirect register referencing. This map entry management facility, and the register map unit described herein, support (in one embodiment) the following map-management functions:

Initializing a map register to a sequence of consecutive values, using a "set map register" instruction. With eight map entries per map register shown above, this operation may initialize the eight map entries to a sequence of eight consecutive values. In one embodiment, the starting value could be provided in an immediate field of a "set map register immediate" instruction, so that the instruction's latency can be held to one cycle (i.e., the initialized map register can be used for an instruction issued in the cycle immediately following that in which the "set map register immediate" instruction is issued).

Incrementing the entries in a map register by a constant, using an "increment map register" instruction. The increment is taken from a corresponding increment register (IR) associated with the map register, with each entry in the map register incremented by the same increment value. Note that there is one increment register for each map register. Note also that in one embodiment, the latency associated with the operation can be held to one cycle (i.e., the incremented map register can be used for an instruction issued in the cycle immediately following that in which the "increment map register" instruction is issued). To this end, pre-incremented map registers (PIMR) are included in the register map unit, with one pre-incremented map register per map register. Each entry in a pre-incremented map register has the value equal to the current value of the corresponding entry in the corresponding map register, incremented by the current value in the corresponding increment register. Execution of an "increment map register" instruction causes the target map register to be loaded from the corresponding pre-incremented map register (i.e., the arrow at the bottom of the RMU in FIG. 4); at the same time, it causes the new values in the target map register to be incremented by the current value in the corresponding increment register and loaded into the corresponding pre-incremented map register (i.e., the arrow at the top of the RMU in FIG. 4). Any change to the contents of a map register, e.g., by a "set map register immediate" instruction or a "move to map register" instruction causes incremented values from the new map register contents to be placed in the corresponding pre-incremented map register.

Moving the contents of a VMX register to a map register or vice versa, using the "move to/from map register" instruction (via, e.g., the "move" line between the registers in FIG. 4). The VMX register that is the source or target of the instruction may be accessed using indirection with the C-map. The "move to map register" operation provides complete flexibility with respect to how registers in the target unit can be indirectly accessed. Maps can be created in VMX registers using the arithmetic, logical, and permutation capabilities of the VMX unit, or they may be loaded to VMX registers from memory; and they can be moved to map registers as needed. Because a register-file to register-file move is necessary for these instructions, it is expected that their latency will be greater than one cycle. A latency of perhaps four cycles is viewed as acceptable for these instructions.

Further, in one implementation, a mask coded in an immediate field could be used to prevent one or more of the entries in a map register, determined by the mask, from being changed by map management instructions. Instructions can also be readily provided to set the values in the increment registers.

Those skilled in the art will note from the above description that provided herein is an SIMD-oriented management facility for managing register maps for map-based indirect register file access of a large register file.

The management facility includes a register map unit having a set of maps, each map of the set of maps including a plurality of map registers. Further, a set of actual registers is provided that are indirectly accessed by the processor via map entries of the set of maps of the register map unit. The number of actual registers in the set of actual registers is greater than the number of map entries in the set of maps, and the map entries in the set of maps reference only a subset of the actual registers at any given time. The facility manages updates to map entries of the set of maps of the register map unit by updating multiple map entries of at least one map of the set of maps responsive to executing of a single update instruction. This managing can occur concurrent with the processor employing at least some other map entries of the set of maps to indirectly access the set of actual registers for the processing of data. No stalling of the processor or execution unit is required in order to implement map entry updating, in accordance with aspects of the present invention. Further, the present invention does not require forcing modifications of all entries in a given map, but still allows for modification of multiple map entries from execution of a single update instruction. The single update instruction can comprise, a single-instruction-multiple-data (SIMD) instruction. Execution of the SIMD instruction results in multiple map entries being updated, but less than all map entries of the at least one map of the set of maps.

Various techniques for instructing the register map unit to update map entries are described. For example, an SIMD-based execution unit and associated SIMD registers (e.g., a VMX execution unit and VMX registers) can be employed to set up multiple map entries in at least one SIMD register, with a "move" instruction being employed to transfer the contents of the at least one SIMD register to at least one map register. Similarly, contents of at least one map register can be transferred to at least one SIMD register since the map registers and SIMD registers preferably have a common physical and logical format. Transfer of map entries from the map registers to the SIMD registers may be advantageous during capturing of a state of a processor, or during context switching. Other techniques for updating map entries include the use of a simple "increment map register" instruction resulting in incremental updating of multiple sequential map entries by a desired value, for example, stored in an increment register associated with the map register being updated. As an extension, pre-incremented map registers can be employed to automatically pre-calculate incremental updates to existing map register values, and the single update instruction can be used to swap the pre-incremented map entries into the corresponding map registers. Still further, a "set map register immediate" instruction can be employed to initialize updating of a series of map entries with a value provided in a field of the instruction itself. By providing multiple approaches to updating map entries within the set of maps of the register map unit, the management facility of the present invention is a very flexible map management mechanism and is efficient, for example, in terms of the fraction of the number of instructions executed in an inner loop that are required to manage the maps. Further, pipeline latencies associated with map management do not adversely effect its flexibility or efficiency.

The detailed description presented above is discussed in terms of program procedures executed on a computer or network of computers. These procedural descriptions and representations are used by those skilled in the art to most effectively convey the substance of their work to others skilled in the art. They may be implemented in hardware or software, or a combination of the two.

A procedure is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

The invention is preferably implemented in a high level procedural or object-oriented programming language to communicate with a computer. However, the invention can be implemented in assembly or machine language, if desired. In any case, the language may be a compiled or interpreted language.

The invention may be implemented as a mechanism or a computer program product comprising a recording medium. Such a mechanism or computer program product may include, but is not limited to CD-ROMs, diskettes, tapes, hard drives, computer RAM or ROM and/or the electronic, magnetic, optical, biological or other similar embodiment of the program. Indeed, the mechanism or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such the electronic test equipment). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

Again, the capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing registers of a processor, the method comprising:

provideing a register mapping comprising a set of maps, each map of the set of maps comprising a plurality of map registers;

providing a set of actual registers indirectly accessed by the processor via map entries of the set of maps of the register mapping, wherein the number of actual registers in the set of actual registers is greater than the number of map entries in the set of maps, and wherein the map entries of the set of maps reference only a subset of the set of actual registers at any given time;

managing updates to map entries of the set of maps of the register mapping by updating multiple map entries of at least one map of the set of maps responsive to executing a single update instruction;

wherein the providing of the register mapping further comprises providing the register mapping with a plurality of increment registers, each increment register being associated with a respective map register of the plurality of map registers, and wherein the managing comprises employing at least one increment register of the plurality of increment registers to update the multiple map entries of the at least one map of the set of maps responsive to the single update instruction, wherein the single update instruction comprises an "increment map register" instruction;

wherein the providing of the register mapping further comprises providing the register mapping with a plurality of pre-incremented map registers, each pre-incremented map register being associated with a respective map register of the plurality of map registers, and wherein the managing further comprises moving pre-incremented map entries from at least one pre-incremented map register to at least one map register of the at least one map employing the single update instruction; and automatically determining map entries of a pre-incremented map register of the plurality of pre-incremented map registers responsive to an update of map entries of an associated map register of the plurality of map registers or its associated increment register of the plurality of increment registers.

2. The method of claim 1, wherein the managing occurs concurrent with the processor employing at least some other map entries of the set of maps to indirectly access the set of actual registers for the processing of data.

3. The method of claim 2, wherein the managing further occurs concurrent with the processor employing at least some other map entries of the at least one map having the multiple map entries being updated via the single update instruction, and wherein the single update instruction comprises a single-instruction-multiple-data (SIMD) instruction.

4. The method of claim 1, wherein the multiple map entries being updated via the single update instruction are less than all map entries of the at least one map of the set of maps.

5. The method of claim 1, wherein the processor further comprises a single-instruction-multiple-data (SIMD) based execution unit and associated SIMD registers, and wherein the managing further comprises employing the SIMD based execution unit and associated SIMD registers of the processor to set up multiple map entry updates in at least one SIMD register, and wherein the managing further comprises moving the multiple map entry updates from the at least one SIMD register to at least one map register of the at least one map employing the single update instruction, wherein the plurality of map registers have a same bit size and logical structure as the SIMD registers, and the single update instruction is a "move data from SIMD register to map register" instruction.

6. The method of claim 5, wherein the moving of the multiple map entry updates from the at least one SIMD register to the at least one map register occurs directly from the at least one SIMD register to the at least one map register of the register mapping without employing a load/store unit of the processor.

7. The method of claim 5, wherein the managing further comprises moving multiple map entries of at least one map of the set of maps of the register mapping to at least one SIMD register of the SIMD registers associated with the SIMD execution unit responsive to a separate, single move instruction, wherein the separate, single move instruction is a "move data from map register to SIMD register" instruction.

8. The method of claim 1, wherein the single update instruction comprises a "set map register immediate" instruction, and wherein the managing further comprises obtaining an initialize value from a field of the "set map register immediate" instruction and initializing incremental updating of the multiple map entries employing the initialize value obtained from the "set map register immediate" instruction.

9. The method of claim 8, wherein the multiple map entries being updated are in at least one map register, the at least one map register comprising a plurality of half-words, and wherein the managing further comprises initializing a first half-word of the at least one map register employing the initialize value obtained from the "set map register immediate" instruction, and updating each sequential half-word of the map register respectively by either an increment of one or an increment value i of at least one associated increment register for the at least one map register.

10. A method of managing registers of a processor, the method comprising:
providing a register mapping comprising a set of maps, each map of the set of maps comprising a plurality of map registers;
providing a set of actual registers indirectly accessed by the processor via map entries of the set of maps of the register mapping, wherein the number of actual registers in the set of actual registers is greater than the number of map entries in the set of maps, and wherein the map entries of the set of maps reference only a subset of the set of actual registers at any given time;
managing updates to map entries of the set of maps of the register mapping by updating multiple map entries of at least one map of the set of maps responsive to executing a single update instruction; and
wherein the set of maps comprises a target map and three source maps, and wherein the target map and the three source maps each comprise four map registers, each map register comprising eight half-word entries, with 32 map entries in each map of the set of maps, and wherein the single update instruction comprises four operands, one operand being a target map identifier, and at least two of the remaining three operands being source map identifiers.

* * * * *